United States Patent [19]

Smith et al.

[11] Patent Number: 5,076,698

[45] Date of Patent: Dec. 31, 1991

[54] SENSING THE SHAPE OF AN OBJECT

[75] Inventors: Martin P. Smith, Wargrave; Robin W. Smith, Croydon, both of England

[73] Assignee: Anstalt Gersan, Vaduz, Liechtenstein

[21] Appl. No.: 432,912

[22] Filed: Nov. 7, 1989

[30] Foreign Application Priority Data

Nov. 9, 1988 [GB] United Kingdom ................ 8826224

[51] Int. Cl.$^5$ .................... G01N 21/00; G01B 11/24; G02B 5/18
[52] U.S. Cl. .................................. 356/376; 356/30; 359/566
[58] Field of Search ................ 356/376, 30, 1, 305, 356/334; 350/162.17, 162.23

[56] References Cited

U.S. PATENT DOCUMENTS

| | | | |
|---|---|---|---|
| 751,347 | 2/1904 | Scheimpflug | 350/420 |
| 3,943,278 | 3/1976 | Ramsey | 356/376 X |
| 4,168,908 | 9/1979 | Cubalchini | 350/102.23 X |
| 4,202,630 | 5/1980 | Suzuki et al. | 356/371 |
| 4,336,989 | 6/1982 | Matsumura et al. | 354/200 |
| 4,455,087 | 6/1984 | Allemand et al. | 356/333 |
| 4,529,305 | 7/1985 | Welford et al. | 356/30 |
| 4,564,295 | 1/1986 | Halioua | 356/376 |
| 4,630,925 | 12/1986 | Schiller et al. | 356/305 X |
| 4,678,324 | 7/1987 | DeWitt | 356/45 |
| 4,705,396 | 11/1987 | Bergstrom | 356/332 |
| 4,758,093 | 7/1988 | Stern et al. | 356/376 |

FOREIGN PATENT DOCUMENTS

| | | |
|---|---|---|
| 0042361 | 12/1981 | European Pat. Off. . |
| 0048346 | 3/1982 | European Pat. Off. . |
| 0079439 | 5/1983 | European Pat. Off. . |
| 0050144 | 3/1986 | European Pat. Off. . |
| 0182469 | 5/1986 | European Pat. Off. . |
| 0235941 | 9/1987 | European Pat. Off. . |
| 0278269 | 8/1988 | European Pat. Off. . |
| 1184633 | 3/1970 | United Kingdom . |
| 1206668 | 9/1970 | United Kingdom . |
| 1251143 | 10/1971 | United Kingdom . |
| 1379769 | 1/1975 | United Kingdom . |
| 1403557 | 8/1975 | United Kingdom . |
| 1405953 | 9/1975 | United Kingdom . |
| 1416568 | 12/1975 | United Kingdom . |
| 1417466 | 12/1975 | United Kingdom . |
| 1493861 | 11/1977 | United Kingdom . |
| 1513611 | 6/1978 | United Kingdom . |
| 2001753 | 2/1979 | United Kingdom . |
| 1589176 | 5/1981 | United Kingdom . |
| 2080712 | 2/1982 | United Kingdom . |
| 2081439 | 2/1982 | United Kingdom . |
| 2096793 | 10/1982 | United Kingdom . |
| 2103355 | 2/1983 | United Kingdom ................ 356/30 |
| 2140503 | 11/1984 | United Kingdom . |
| 2144536 | 3/1985 | United Kingdom . |
| 2186685 | 8/1987 | United Kingdom . |
| 2195178 | 3/1988 | United Kingdom . |
| 2203833 | 10/1988 | United Kingdom . |
| 2210452 | 6/1989 | United Kingdom . |
| WO86/07444 | 12/1986 | World Int. Prop. O. . |

OTHER PUBLICATIONS

"Range Measurement Using Dynamic Fringe Projection", Shaw et al., *J. Phys. D: Appl. Phys.* 21, 1988, pp. S4–S7 Printed in the United Kingdom.

(List continued on next page.)

*Primary Examiner*—Bruce Y. Arnold
*Assistant Examiner*—David R. Parsons
*Attorney, Agent, or Firm*—Kerkam, Stowell, Kondracki & Clarke

[57] ABSTRACT

In order to determine the external profile of a diamond, particularly a large diamond which has re-entrant features, an elongate and thin beam is projected onto the diamond while the diamond is rotated about an axis normal to the beam; an imaging system is used to image from one side the line along which the beam strikes the diamond, this image being formed on a diffraction grating which is tilted in accordance with the Scheimpflug condition and in order to employ the first order beam of the diffraction grating. The image on the diffraction grating is viewed with a second imaging system. Furthermore, there may be a substantial improvement in light capture. The arrangement is applicable to systems other than those for determining profile.

19 Claims, 1 Drawing Sheet

OTHER PUBLICATIONS

"Design of a Large Depth of View Three-Dimensional Camera for Robot Vision", Rioux et al., *Optical Engineering*, vol. 26, No. 12, Dec. 1987, pp. 1245-1250.

"A Laser Scanning Camera for Range Data Acquisition", Reid et al., *J. Phys. D: Appl. Phys.* 21, 1988, pp. S1-S3 Printed in the United Kingdom.

"Industrial Applications of Optical and Electro-Optic Contouring Techniques", Koukash et al., Abstract from proceeding of NeECOOSA Symposium, European Conference on Optics, Optical Systems & Application, May 12, 1988.

"The Paraxial Theory of Optical Instruments", R. S. Longhurst, *Geometrical and Physical Optics*, Second Edition, pp. 42 & 43, Longman 1967.

"The Telecentric Stop", Warren J. Smith, *Modern Optical Engineering*, p. 131, McGraw-Hill 1966.

Rudolf Kingslake, *Optical System Design*, 1983, Academic Press, pp. 58, 59, 88, 89, 268, 269, 270, 271, 272 and 273.

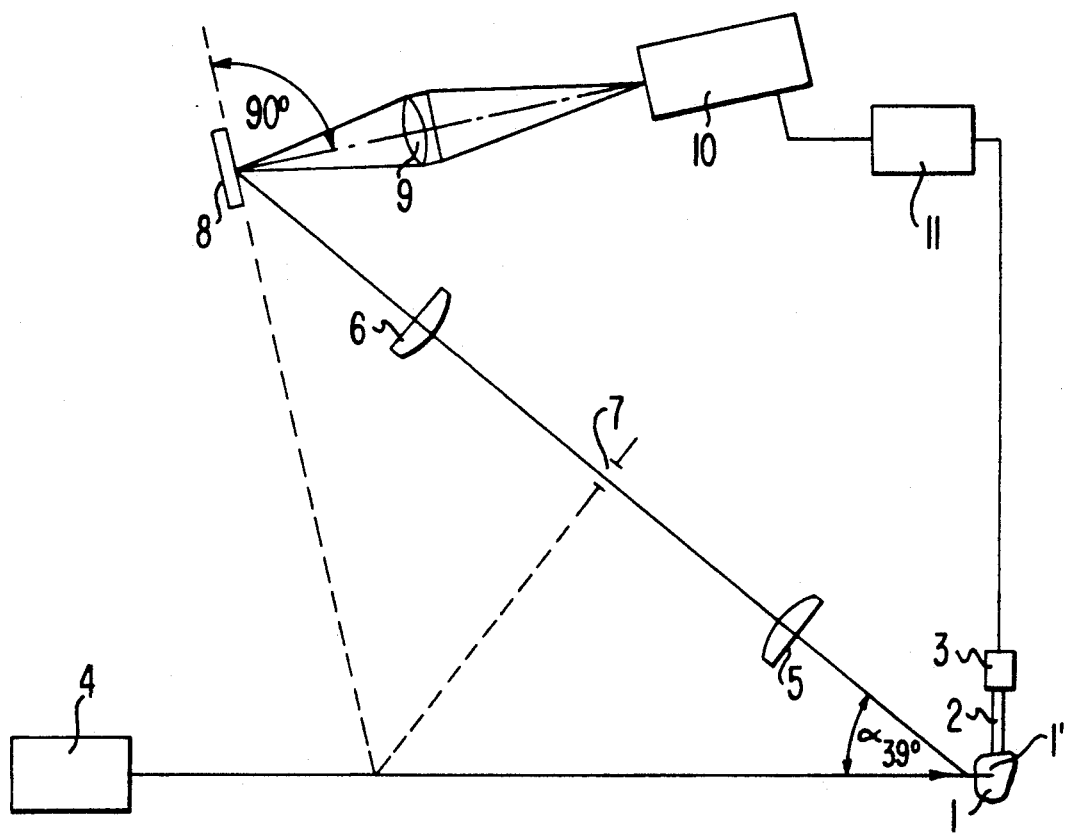

SENSING THE SHAPE OF AN OBJECT

BACKGROUND OF THE INVENTION

The present invention relates to a method of imaging an object parts of which are substantially further from the imaging system than other parts. The problems arising were initially encountered when photographing buildings where, without correction, the tops of the buildings appear too narrow and foreshortened. However, whilst being of general applicability, the invention has particular applicability to sensing the shape of an object by scansion or projecting onto the object an incident beam the incident radiation, as seen in cross-section normal to the direction of propagation of the radiation, is elongate and thin, whereby the radiation strikes the object along a line; in other words, there is either a stationary beam which is elongate and thin in this section, or there is a scanned beam which sweeps out an area which is elongate and thin in this section. The line is imaged along an axis at a substantial angle to the plane of the incident beam (the plane of the beam is that plane normal to the smallest dimension of the beam). In other words, the shape is detected using a thin sheet of light (a narrow beam), whether continuous or scanned, which is played upon the article; observation off the axis of the beam, i.e. from one side, reveals the profile or contour of the object. The object itself can be rotated with respect to the beam so that the whole of its surface is observed. An imaging system is used to image the points where the beam strikes the article. Such a method is disclosed in GB-A-2 103 355 (equivalent to U.S. Pat. No. 4,529,305). Normally, visible light will be used, but at least in theory other forms of radiation, such as infra-red or ultra-violet, could be used.

The present invention is applicable to any suitable object and any suitable profile, e.g. profile/contour measurement of machine parts—it is especially useful for objects which are different to measure with a micrometer, such as screws, gears, turbine blades and plastic mouldings. and for fragile objects requiring a non-contact method. However, the invention has been developed with respect to gemstones, particularly diamonds, and is especially useful for large stones, e.g. having a weight greater than say 10 ct (2 g), with re-entrant features. The invention can be used to determine the shape of objects which are mounted and rotated.

In general, to obtain an image which geometrically reproduces the object, the objective of the imaging system should be tilted from the normal to the object, and the imaging plane should be tilted with respect to the objective and with respect to the normal to the object. Such an arrangement is known in photography, where tilting bellows are used on a camera, and the Scheimpflug condition specifies the angle of the image plane. There is a problem with this type of imaging. The light enters the imaging system at a large angle of incidence, and much is lost by reflection. Also, due to the constraints of the system, it is difficult to change the magnification (as may be required e.g. to examine more closely a re-entrant feature in a diamond).

SUMMARY OF THE INVENTION

According to the present invention an image of the object is formed on a directional screen such as a diffraction grating and the directional screen is viewed using an imaging system. More particularly, an incident beam can be scanned or projected onto the object so that, as seen in cross-section normal to the direction of propagation, the incident radiation is elongate and thin; in this way the beam strikes the object along a line, the line being imaged along an axis at a substantial angle to the plane of the incident beam. The invention extends to apparatus for imaging the objects and comprising diffraction grating means, a first imaging system for forming an image of the object on the directional screen, and a second imaging system for forming an image of the first image, i.e. the image on the directional screen. The invention employs a diffraction grating (or the like) as a directional screen which passes reflected or refracted radiation to the imaging system. The diffraction grating acts as a directional mirror, and any suitable imaging system can be used after the diffraction grating.

Normally, an image of the object will be formed on the diffraction grating. Normally, the diffraction grating first order beam is employed. The grating is orientated so that the reflected or transmitted diffracted beam is at the correct angle for the final imaging system, the diffraction grating normally being normal to the final imaging system. The cone angle of incidence on the grating should be smaller than the diffraction angle. A blazed or tuned grating can be used and arranged so that a large percentage of the radiation (e.g. 80-90%) is in one beam; the beam is preferably the first order beam, but it is possible to blaze for the second, third or fourth order beams.

The grating enables much more radiation to pass into the imaging system as there can be normal incidence on the imaging system, enabling the aperture to be maximised and avoiding marked reflection losses; however the grating maintains the same image quality without introducing any further aberrations. Furthermore, the magnification can be changed very simply, merely by exchanging the lens system, or a zoom can be used. The image size or the revolution (or both) can be changed.

Any suitable grating or the equivalent can be used as the directional screen—the grating may be holographic. Any device which substantially or effectively has the same effect as a diffraction grating can be used as the directional screen, provided it has sufficient planarity to give suitable imaging. The pitch of spacing of the grating or equivalent should be smaller than the resolution required for the object being examined, e.g. a grating of $10\mu$ resolution for high resolution examination and a grating of $50\mu$ resolution for lower resolution examination.

Any suitable techniques can be introduced. For example, the light from the object can be subjected simultaneously to multiple analysis (different analyses of separate beams), e.g. using two or more imaging systems in association with two or more wavelengths or one or more beam splitters, and two or more gratings (e.g. using visible light and near infra-red).

Any suitable radiation can be used, preferred radiations being the near infra-red and visible.

BRIEF DESCRIPTION OF THE DRAWING

The invention will be further described, by way of example, with reference to the accompanying drawing, which is a schematic diagram showing the determination of the shape of a diamond.

DESCRIPTION OF THE PREFERRED EMBODIMENT

A diamond 1 is mounted on a dop 2 which is carried by a mechanism 3 which can move the diamond 1 about any of three orthogonal axes. The diamond 1 is illustrated by an illuminator 4 which provides an incident beam which, as seen in cross-section normal to the direction of propagation of the beam, is elongate and thin, or which is in the form of a spot which is scanned along a line; in either case, the beam strikes the diamond 1 along a line 1'. By imaging the line 1' along an axis at a substantial angle $\alpha$ to the plane of the incident beam, the shape or contour of the diamond 1 along said line 1' can be seen. This technique is described in GB-A-2 103 355.

To examine the shape of the line 1', two imaging systems are used. A first imaging system is represented by two lenses 5, 6 with an intervening aperture 7 which forms a telecentric stop; the aperture 7 is shown at the focal point of the lens 5 and also at the focal point of the lens 6. This imaging system forms an image of the line 1', i.e. of the object in question, on a diffraction grating 8. The diffraction grating 8 is at an angle to the optical axis of the first imaging system 5, 6 which is determined by the Scheimpflug condition. Also, the angle of incidence onto the diffraction grating 8 corresponds to the first order beam of the grating 8. The image on the diffraction grating 8 is viewed by a second imaging system which is represented by a lens 9, and the image is formed on a detector 10 which can be, for instance, a TV camera or a CCD array. The detector 10 is shown connected to a microprocessor 11. In turn, the microprocessor 11 can be connected to the first and/or second imaging system, to the mechanism 3 and to the illuminator 4. The microprocessor 11 is programmed in a way now known in order to map the whole shape of the diamond 1 as the diamond 1 is rotated by the mechanism 3.

In one arrangement, the illuminator 4 has two beams available, namely a high resolution beam which is 10$\mu$ wide and 3 mm long and a low resolution beam which is 50$\mu$ wide and 10 mm long. These dimensions are of a cross-section of the beam in a direction or a plane normal to the direction of propagation of the beam. Many diamonds are longer than 3 mm and thus the high resolution beam will only illuminate part of the length of the diamond 1. It would, however be possible for the illuminator 4 to have some zoom arrangement so that the beam corresponds to the length of the diamond 1. To provide high resolution and low resolution alternatives, the first imaging system can be arranged to give a 1:1 or alternatively 2:1 or 4:1 magnification onto the grating 8 (or could be a zoom system), so that the image on the grating 8 is roughly the same size whether the high resolution beam or the low resolution beam is being used. It is also possible to provide two different magnifications or a zoom in the second image system 9. All these variations can be under the control of the computer 11. In one automatic system, the low resolution beam is used until a re-entrant feature is detected—limiting rays may not enter a re-entrant feature; the microprocessor 11 then automatically changes the system over to a high resolution beam in order to map the re-entrant.

The illuminator 4 is either an air-cooled argon ion 50 mW laser manufactured by Omnichrome (used for the initial experiments) or a HeNe 15 mW laser manufactured by Spectra Physics of the USA. For an argon ion laser: the preferred wavelength is 514.5 nm, though other wavelengths can be used such as 488 nm. If a HeNe laser is used, the wavelength is 632.8 nm.

Lenses 5 and 6 are manufactured by Spindler & Hoyer GmbH, part number 322239. In alternative arrangements, the ratio of the focal lengths of the lenses 5 and 6 can be changed to give magnifications of 1$\times$, 2$\times$ and 3$\times$.

Aperture 7 is a variable iris of diameter 5 to 20 mm.

The diffraction grating 8 is a—a holographic grating manufactured by American Holographic Inc. of size 30 mm $\times$ 30 mm $\times$ 6 mm with 1500 lines/mm optimised for 500 nm operation (for the argon ion laser). A different grating would be required for HeNe laser wavelength due to the different position of the diffracted orders. The angle $\alpha$ and angular position of the grating would also be different due to operating at a different wavelength. Two different lenses can be used for the imaging lens 9, having different focal lengths, namely 120 mm positioned 240 mm from the grating 8 to give 1$\times$ magnification, and 60 mm positioned 60 mm from the grating 8 to give 8$\times$ magnification. To change the magnification, the different lenses are dropped in and out of the optical path of the imaging system.

The detector is 10 - a CCD tv camera or a Vidicon tv camera.

The following distances are used:
diamond 1 to lens 5—140 mm;
lens 5 to aperture 7—140 mm;
aperture 7 to lens 6—140 mm;
lens 6 to grating 8—140 mm.

The present invention has been described above purely by way of example, and modifications can be made within the spirit of the invention.

We claim:

1. A method of sensing the shape of an object, comprising:
   scanning or projecting onto the object an incident beam of radiation whereby the radiation, as seen in cross-section normal to the direction of propagation of the radiation, is elongate and thin, whereby the incident radiation lies substantially in a plane and strikes the object along a line;
   forming an image of said line on a directional screen, which is at an angle to the optical axis of light coming from the object, said angle being in accordance with the Scheimpflug condition, said optical axis being at a substantial angle to the plane of said incident radiation; and viewing the directional screen using an imaging system to form a final image, the directional screen being normal to the optical axis of the imaging system which forms the final image.

2. The method of claim 1, wherein said optical axis of light coming from the object is aligned with the first order beam of the directional screen.

3. The method of claim 1, wherein said object is a gemstone.

4. The method of claim 1, wherein the directional screen is a diffraction grating.

5. A method of sensing the shape of an object, comprising:
   scanning or projecting onto the object an incident beam of radiation whereby the radiation, as seen in cross-section normal to the direction of propagation of the radiation, is elongate and thin, whereby the incident radiation lies substantially in a plane and strikes the object along a line;

forming an image of said line on a directional screen using a first imaging system whose optical axis is at a substantial angle to the plane of said incident radiation, the directional screen being at an angle to said optical axis which is in accordance with the Scheimpflug condition; and viewing the direction screen using a second imaging system, the directional screen being normal to the optical axis of the second imaging system.

6. The method of claim 5, wherein the optical axis of the first imaging system is aligned with the first order beam of the direction screen.

7. The method of claim 5, wherein the object is a gemstone.

8. The method of claim 5, wherein the directional screen is a diffraction grating.

9. A method of imaging an object parts of which are substantially further from an imaging system than other parts, the method comprising:
forming an image of the object on a directional screen using means comprising a first imaging system in turn comprising a telecentric stop; and
viewing the directional screen using a second imaging system whose optical axis is at a substantial angle to the optical axis of said first imaging system.

10. The method of claim 9, wherein said first imaging system has a magnification other than unity.

11. The method of claim 9, wherein the directional screen is a diffraction grating.

12. A method of sensing the shape of an object, comprising:
scanning or projecting onto the object an incident beam of radiation whereby the radiation, as seen in cross-section normal to the direction of propagation of the radiation, is elongate and thin, whereby the incident radiation lies substantially in a plane and strikes the object along a line;
using a first imaging system to form an image of said line on a directional screen which is at an angle to the optical axis of said first imaging system, said angle being in accordance with the Scheimpflug condition, said optical axis being at a substantial angle to the plane of said incident radiation, said first imaging system comprising a telecentric stop; and
viewing the directional screen using a second imaging system to form a final image, the directional screen being normal to the optical axis of said second imaging system.

13. The method of claim 12, wherein said object is a gemstone.

14. The method of claim 12, wherein said first imaging system has a magnification other than unity.

15. Apparatus for sensing the shape of an object, the apparatus comprising:

means for scanning or projecting onto the object an incident beam of radiation which radiation, as seen in cross-section normal to the direction of propagation of the radiation, is elongate and thin, whereby the incident radiation will lie substantially in a plane and strike the object along a line;
first imaging means for imaging said line along an axis at a substantial angle to the plane of said incident radiation;
a directional screen, which is at an angle to said axis which is in accordance with the Scheimpflug condition; and
a second imaging system having an optical axis normal to the directional screen, for forming an image of said line, whereby the latter image represents the shape of the object along said line.

16. Apparatus for imaging an object parts of which are substantially further from the imaging system than other parts, the apparatus comprising:
a directional screen;
means comprising a first imaging system for forming an image of the object on the directional screen, the first imaging system comprising a telecentric stop;
and a second imaging system for forming an image of the image on the directional screen, the optical axis of the second imaging system being at a substantial angle to the optical axis of the first imaging system.

17. The apparatus of claim 16, wherein said first imaging system has a magnification other than of unity.

18. Apparatus for sensing the shape of an object, comprising:
means for scanning or projecting onto the object an incident beam of radiation which radiation, as seen in cross-section normal to the direction of propagation of the radiation, is elongate and thin, whereby the incident radiation will lie substantially in a plane and strike the object along a line;
a directional screen;
means comprising a first imaging system for forming an image of said line on the directional screen, the optical axis of the first imaging system being at a substantial angle to the plane of said incident radiation, and said first imaging system comprising a telecentric stop, the directional screen being at an angle to the optical axis of the first imaging system which is in accordance with the Scheimpflug condition; and
a second imaging system for forming an image of the image on the directional screen, the second imaging system having an optical axis normal to the directional screen, whereby the image formed by the second imaging system represents the shape of the object along said line.

19. The apparatus of claim 18, wherein the directional screen is a diffraction grating.

* * * * *